United States Patent [19]
Capucio

[11] 3,824,915
[45] July 23, 1974

[54] DROP-OUT TOASTER

[76] Inventor: Eugene G. Capucio, P.O. Box 1087, Caracas, Venezuela

[22] Filed: Aug. 18, 1972

[21] Appl. No.: 281,924

[52] U.S. Cl............................. 99/329 RT, 99/393
[51] Int. Cl. ......................................... A47j 37/08
[58] Field of Search............ 99/329 R, 329, RT, 334, 99/335, 389, 390, 391, 392, 393, 400

[56] References Cited
UNITED STATES PATENTS

| | | | |
|---|---|---|---|
| 2,465,577 | 3/1949 | Cox................................ | 99/400 UX |
| 2,548,958 | 4/1951 | DiRosa et al.................... | 99/329 RT |
| 2,644,392 | 7/1953 | Foster............................. | 99/329 RT |
| 3,208,371 | 9/1965 | Chivers............................ | 99/391 X |
| 3,229,613 | 1/1966 | Matzenauer..................... | 99/391 X |

Primary Examiner—Harvey C. Hornsby
Assistant Examiner—Philip R. Coe
Attorney, Agent, or Firm—Pennie & Edmonds

[57] ABSTRACT

There is disclosed a toaster of unique design having an upper toaster section and a lower toast receiving section telescopically receivable within the toaster section, the toaster section having means for retaining toast and for releasing toast to drop out into the toast receiving section.

3 Claims, 7 Drawing Figures

PATENTED JUL 23 1974

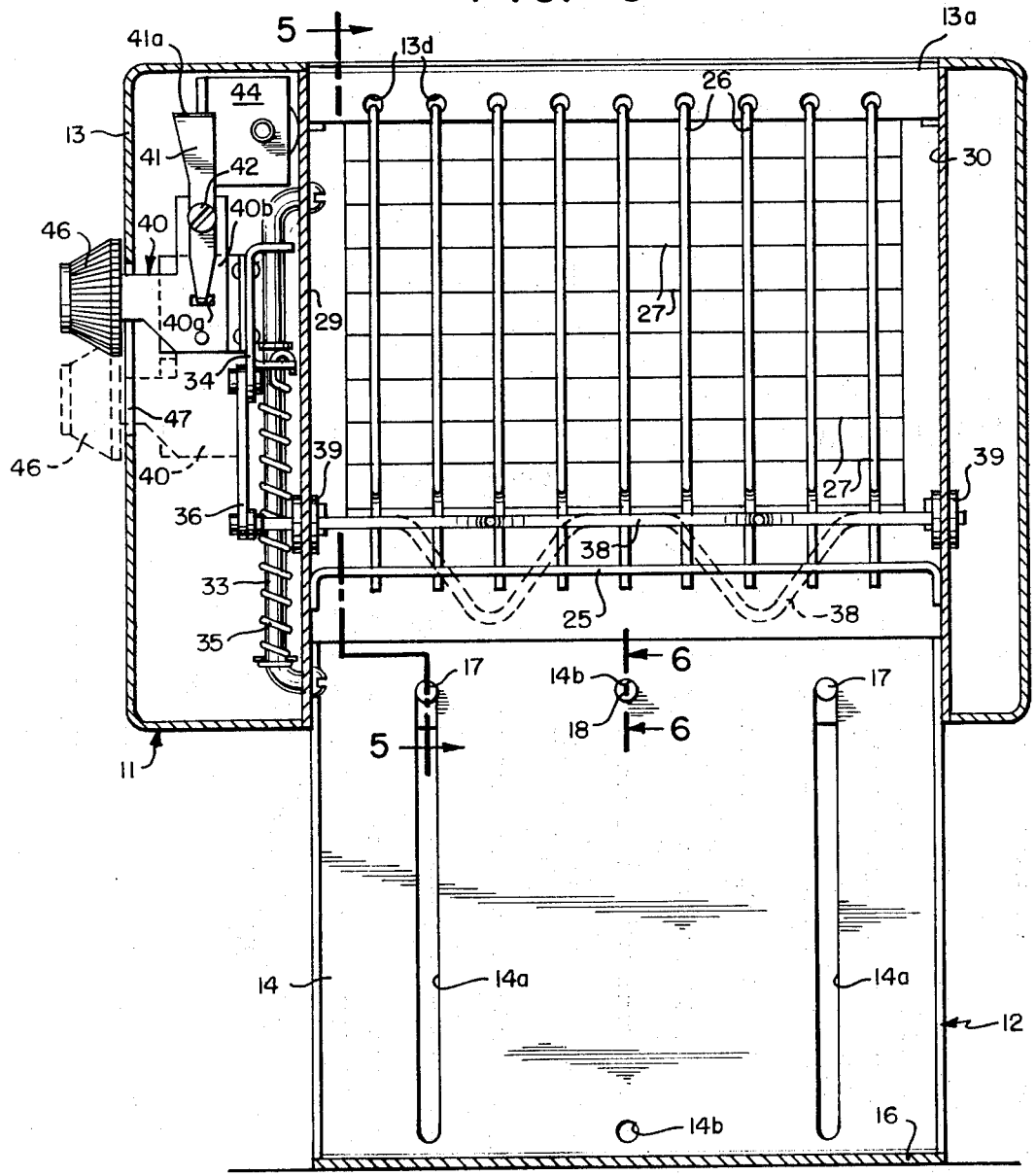
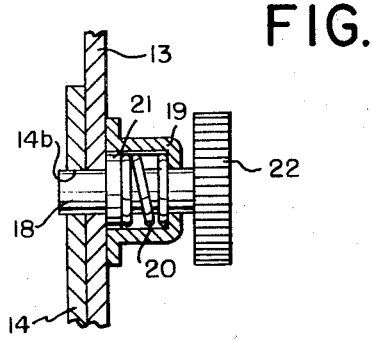
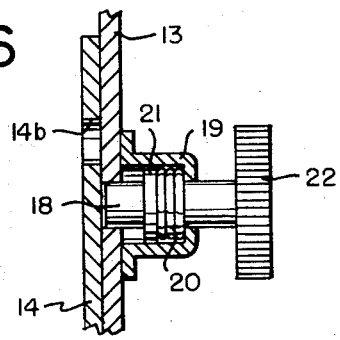

PATENTED JUL 23 1974  3,824,915

DROP-OUT TOASTER

BACKGROUND OF THE INVENTION

Conventional pop-up toasters provide a pan at the bottom of the toaster into which drippings, crumbs or other matter can accumulate. Removal of the pan is a tedious process, and as a consequence, waste matter may be allowed to accumulate therein, which is unsanitary and can cause insect infestation. Also, an excessive accumulation of bread crumbs in the pan will cause the burnt-toast odor which prevails when an uncleanly toaster is in use and which is transmitted to each newly toasted food item. Another problem inherent in the conventional toaster is the uneven heating of toast and the distortion due to residual heat which will occur after the toaster has popped up if the toast is allowed to remain in the toaster.

It is the purpose of the present invention to provide a toaster which obviates the above difficulties.

SUMMARY OF THE INVENTION

In accordance with the invention, a toaster of novel design is provided which includes a toaster section, means in the toaster section for toasting bread or other food items, the section defining at least one vertical opening for the passage therethrough of said food item, a receiving section disposed beneath said toaster section and means in said toaster section for holding said food item for toasting and for releasing said food item to drop from said toaster section into said toast receiving section. In accordance with further aspects of the invention, the receiving section is telescopically receivable within the toaster section for storage and may be extended therefrom when the toaster is in use. The invention further provides novel means for supporting toast within the vertical openings provided in the toaster section until toasting has been completed; and means for moving the toast supporting means to release toast from the toaster section so that it may be drop out into the receiving section.

The advantages of the above construction are that the pan provided in the conventional toaster is eliminated, and the attendant unsanitary condition which prevails when an accumulation of crumbs or drippings remain in the pan is avoided. With the new toaster, a passage for the free circulation of air about a food item as it is being toasted is provided, which greatly improves the flavor produced by toasting and permits much more even toasting. Furthermore, when the toast is completed, it simply drops into the receiving section and is no longer subject to residual heat from the heating elements of the toaster as would be the case with the conventional pop-up toaster unless the toast is removed promptly. These and various other aspects of the invention will be found in the following detailed description of a particular embodiment and the accompanying drawing.

BRIEF DESCRIPTION OF THE DRAWING

FIG. 3 is a section taken in the direction of arrows 3—3 of FIG. 2;

FIG. 6 is a section taken in the direction of arrows 6—6 of FIG. 3 showing details of a locking means for securing the toaster section with respect to the receiving section thereof; and FIG. 7 is a view similar to FIG. 6 showing the locking means in a sequential position.

DESCRIPTION OF A PARTICULAR EMBODIMENT

Figure 1:
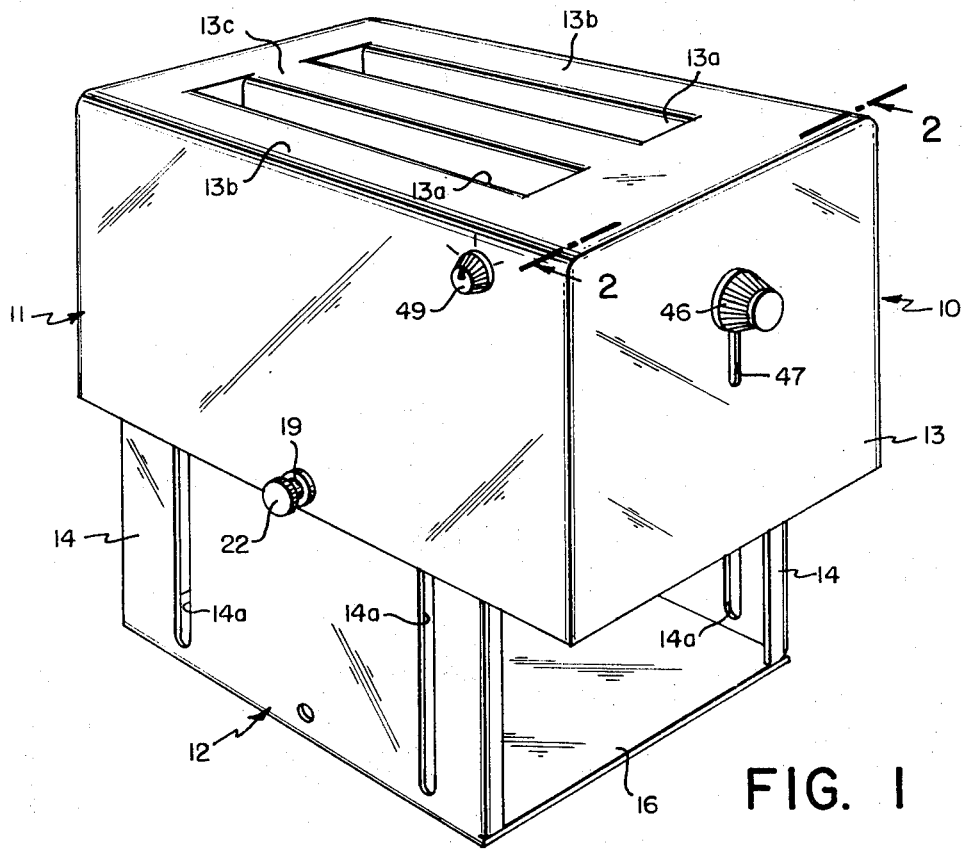
FIG. 1 is a perspective view of the drop-out toaster of the invention.

Referring to the drawing, a toaster 10 constructed according to the principles of the present invention has been illustrated. The toaster 10 has an upper toaster section 11 and a lower toast receiving section 12. The toaster section 11 includes an outer casing 13 which defines vertical, elongated openings 13a for receiving bread or other food items therein for toasting.

The lower toast receiving section 12 comprises upright side walls 14 interconnected by a bottom 16. The side walls 14 define slots 14a, which slidably receive pins 17 attached to casing 13. The section 12 can, therefore, be telescopically received within the upper section 11 for storage of the toaster 10, such telescoping movement being supported by the riding of pins 17 within grooves 14a. Sides 14 of the lower section 12 include circular openings 14b at upper and lower ends thereof which cooperate with a plunger 18 (FIGS. 6 and 7) to secure the section 12 in the fully telescoped position within section 11 or to secure the section 12 in the fully extended position shown in FIGS. 1 and 3. The plunger 18 is reciprocable within a housing 19 attached to the outer wall of casing 13. A spring 20 about the shaft of plunger 18 is retained between the housing 19 and a collar 21 secured to the plunger. Handle 22 permits the withdrawal of plungers 18 from respective openings 14b and the relative sliding movement between side walls 14 and casing 13 as shown in the sequence of FIGS. 6 and 7.

Figure 5:
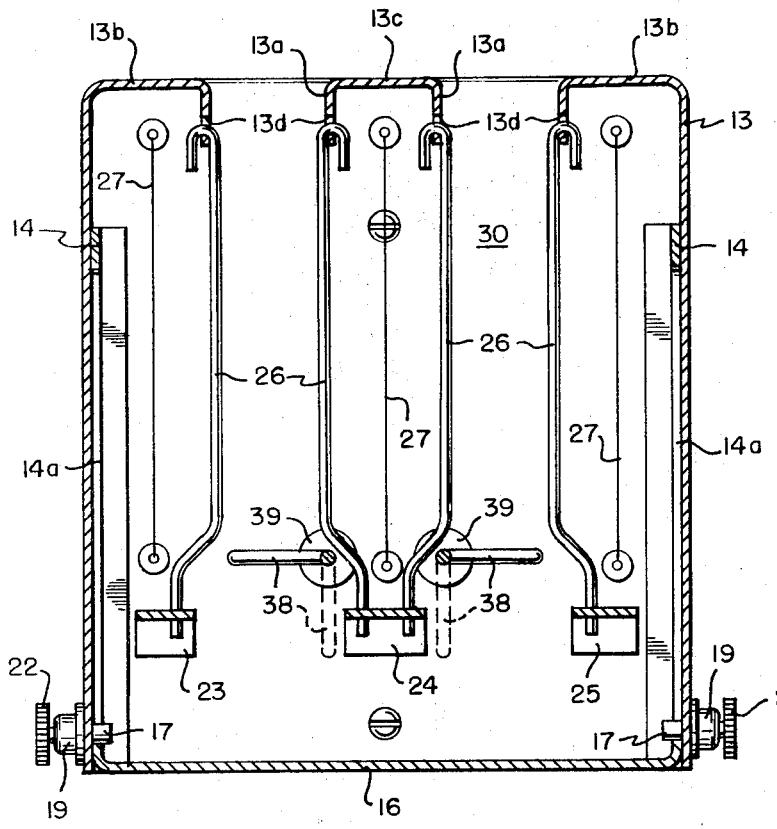
FIG. 5 is a section taken in the direction of arrows 5—5 of FIG. 3.

As best seen in FIG. 5, the casing 13 includes upper sections 13b and a center section 13c, which in a longitudinal sense define the openings 13a for the reception of the item to be toasted. Brackets 23, 24 and 25 are secured to opposing end walls of the casing 13, extending therebetween and receiving the lower end of a plurality of guide members 26. The upper ends of guide members 26 are secured within openings 13d provided in the depending portions respectively of sections 13b and 13c of the casing. Furthermore, a plurality of heating elements 27 in the form of a conventional toaster grid extend between the opposite internal wall portions 29 and 30 of section 11, between respective guide members 26. Heating elements 27 are connected by lead 27a to input power lead 31 through a switch 32 whose function will be described presently.

Figure 2:
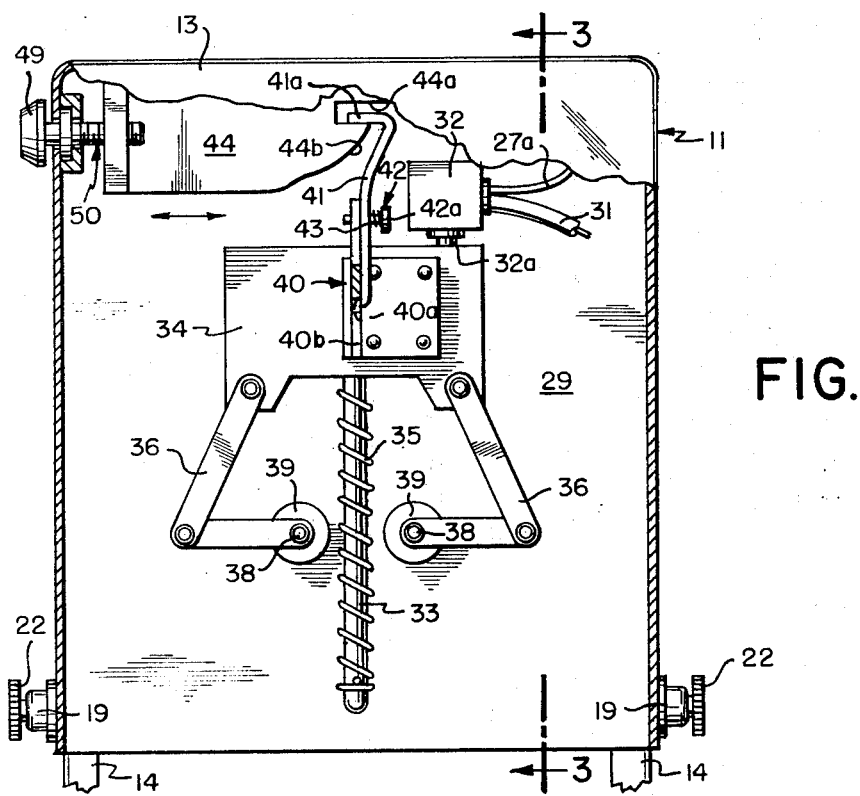
FIG. 2 is a section taken in the direction of arrows 2—2 of FIG. 1.
Figure 4:
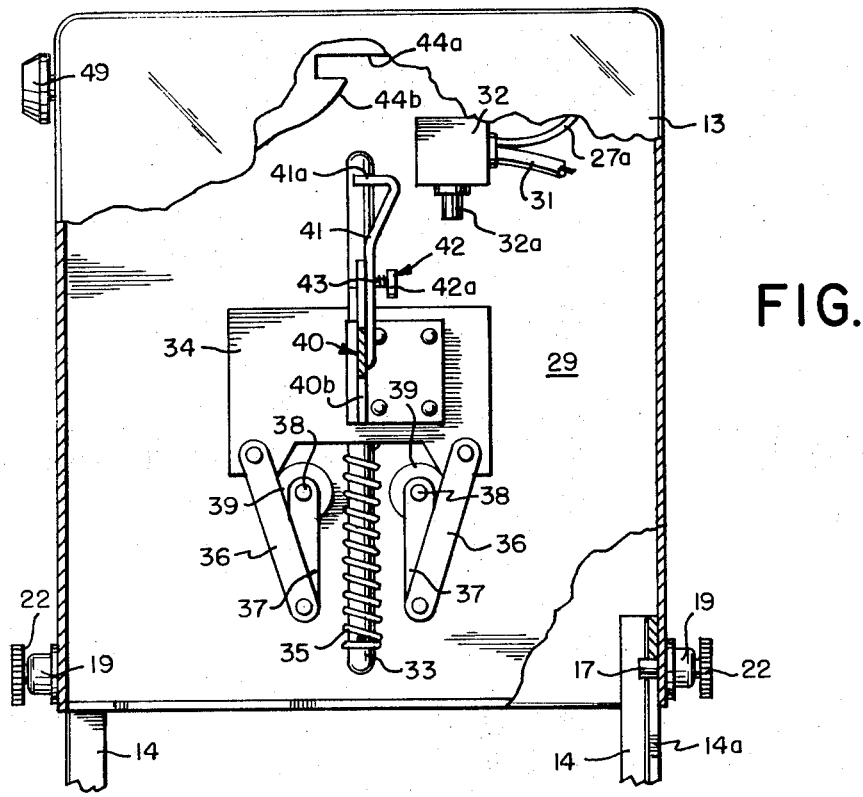
FIG. 4 is a partial end view with parts broken away of the drop-out toaster of FIG. 1.

As best seen in FIGS. 2–4, a carriage guide 33 is connected to the wall 29 and slidably receives thereupon a carriage 34. A spring 35 coiled about guide 33 is compressed by upward movement of the carriage 34. Arms 36 are pivotally mounted to the lower end of carriage 34 and are pivotally connected through arms 37 to toast supporting bars 38. The ends of bars 38 are rotatable through walls 29 and 30 and are secured thereto by bushings 39. Thus, when carriage 34 is in its upper position as shown in FIG. 3, toast supporting bars 38 will be brought into the horizontally extended position of FIG. 5. When, however, the carriage 34 is in its lower position (FIG. 5), the toast supporting bars 38 are moved into their depending or vertical position as indicated by the dotted lines in FIG. 5.

Carriage 34 is connected through L-shaped bracket 40 to a bi-metallic trigger element 41. The lower end of trigger element 41 is retained within a slot 40a in the leg 40b of the bracket and an intermediate portion of the trigger element is secured to leg 40b by means of a spring-mounted pin 42. Spring element 43 is retained between trigger element 41 and a head portion 42a will urge the upper end 41a of the trigger element 41 toward the leg 40b. The upper end 41a of the trigger element is bent at generally right angles with respect to the vertical portion thereof and will be received (See FIG. 2) within a notch 44a of darkness control member 44. The control member 44 has a cam surface 44b along which the end 41a of the trigger arm 41 will ride when the carriage 34 is raised into its upper position, until the end 41a of the trigger element is brought adjacent to the notch 44a. At this point, the spring element 42 will effect entry of the end 41a of the trigger element 41 into the notch 44a, and this will secure the carriage 34 in its upper position. In order to raise the carriage 34 into its upper position, a reset knob 46 is connected to the leg 40b of the bracket 40 extending through a slot 47 provided therefor in the casing 13. When the carriage has been raised to its upper position, the switch button 32a will be depressed and current will flow to heating elements 27.

Control member 44 is connected to knob 49 by means of the threaded linkage 50 shown in FIG. 2. The knob 49 may be rotated as indicated in FIG. 1 from light, medium to dark positions thereof, and during such rotation, the member 44 will be translated toward the trigger member 41. As a consequence, the end 41a of the trigger element will project to a greater degree within the notch 44a.

The operation of the drop-out toaster is as follows: When the toaster 10 is in its stored position, section 12 will be fully telescoped within section 11 and will be held in this position by interengagement between plunger 18 and the outermost circular openings 14b. In order to operate the toaster, the plungers 18 will be withdrawn from the outermost openings 14b to permit the extension of side walls 14 from within the casing 13, such movement being supported by pins 17 riding in grooves 14a. When the section 12 is fully extended, plungers 18 will extend through the innermost openings 14b provided in the side walls 14 to hold the sections 11 and 12 securely in position.

Before placing food items within the slots 13a, the reset knob 46 will be raised to its uppermost position. In so doing, arms 36 and 37 will cause rotation of toast support bars 38 into their horizontal position. Simultaneously, switch 32 will operate to pass current into the heating elements 27. Also, bi-metallic trigger element 41 will be raised sufficiently to have the end 41a thereof project into the notch 44a of member 44. This will secure the carriage 34 in its upper position against the pressure of spring 35 until such time as the bi-metallic member 41 deflects laterally away from member 44 to remove the upper end 41a thereof from the notch 44a. The amount that the bi-metallic trigger element 41 has to move in order to permit its release from the notch 44a is determined by the setting of the knob 49, which controls the inward and outward movement of notch carrying control member 44. When the trigger element 41 has deflected sufficiently to be released from notch 44a, spring 35 will draw carriage 34 downwardly, thus rotating toast supporting bars 38 into their depending position and permitting the toast or other food item to drop into the section 12. Movement of carriage 34 from its upper position will operate switch 32 to break the circuit to heating elements 27.

The drop-out toaster of the invention will provide improved toasting for several reasons. First of all, since an accumulation of crumbs and drippings in a pan lying immediately beneath the toast is not possible in this construction, the adulteration of newly toasted items is eliminated. Secondly, the new toaster produces a flat, moist and uniformly-tempered toast since a free passage of air is maintained around the item being toasted, the bottom of the toaster being open, and this gives the toast a uniform, tempered texture with no distortion of the slice. Finally, in contrast to conventional toasters, when the toast is finished in the new toaster, the toast drops out cleanly into the receiving section. In conventional toasters, the toast merely pops up, and unless it is removed immediately, the lower portion of the toast continues to be heated by the residual heat remaining in the toaster and an uneven toasting effect is produced.

It will be understood that the foregoing description relates to a particular embodiment of the invention and is therefore representative. In order to understand the scope of the invention, reference should be made to the appended claims.

I claim:

1. A toaster comprising a toaster section; heating means in said section for toasting a food item; said section defining at least one vertical opening for the passage therethrough of said item, a receiving section disposed beneath said toaster section, and means in said toaster section for holding said item for toasting and for releasing said item to drop from said toaster section into said receiving section; said holding and releasing means including a toast supporting bar, portions thereof extending horizontally across said vertical opening upon which said item may rest, and means for rotating said bar to move said extending portions from a horizontal position to a vertical position whereby said item may fall past said toast supporting bar; a vertically movable carriage, guide means in said toaster section for supporting vertical movement of said carriage between lower and upper positions, means interconnecting said carriage and said toast supporting bar to cause rotation of said bar into a toast supporting position when said carriage is in its upper position and into a toast releasing position when said carriage is in its lower position; a bi-metallic trigger element connected to said carriage; a control member defining a notch for receiving an end of said bi-metallic element when said carriage is in its upper position to secure said carriage in said upper position; said bi-metallic element being deflected to release said element from said control member upon sensing a predetermined amount of heat; and spring means for moving said carriage upon said release into its lower position.

2. The toaster according to claim 1 wherein said control member defining said notch is movable toward and away from the end of said bi-metallic element whereby varying periods of time are required for the release of said bi-metallic element from said control member.

3. The toaster according to claim 1 wherein said receiving section is telescopically receivable within said toaster section, and means for securing said receiving section in telescoped position within said toaster section for storage and for securing said receiving portion in extended operative relation from said toaster portion.

* * * * *